(12) United States Patent
Ohtsuka

(10) Patent No.: US 10,429,235 B2
(45) Date of Patent: *Oct. 1, 2019

(54) OPTICAL FIBER SENSOR SYSTEM FOR STRAIN DETECTION

(71) Applicant: Sumitomo Electric Industries, Ltd., Osaka-shi (JP)

(72) Inventor: Takafumi Ohtsuka, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 219 days.

This patent is subject to a terminal disclaimer.

(21) Appl. No.: 15/628,187

(22) Filed: Jun. 20, 2017

(65) Prior Publication Data

US 2017/0363461 A1 Dec. 21, 2017

(30) Foreign Application Priority Data

Jun. 21, 2016 (JP) ................................ 2016-122903

(51) Int. Cl.
*G01H 9/00* (2006.01)
*G01L 1/24* (2006.01)

(52) U.S. Cl.
CPC ............. *G01H 9/006* (2013.01); *G01H 9/004* (2013.01); *G01L 1/243* (2013.01)

(58) Field of Classification Search
CPC ......... G01H 9/006; G01H 9/004; G01L 1/243
USPC ........................................................ 73/657
See application file for complete search history.

(56) References Cited

U.S. PATENT DOCUMENTS

| 4,410,275 | A | * | 10/1983 | Shaw | G01C 19/64 356/460 |
| 4,529,312 | A | * | 7/1985 | Pavlath | G01C 19/72 356/460 |
| 4,735,506 | A | | 4/1988 | Pavlath | |
| 5,012,088 | A | * | 4/1991 | Cole | G01D 5/35303 250/227.19 |
| 5,208,652 | A | * | 5/1993 | Sonobe | G01C 19/72 356/460 |
| 5,608,525 | A | * | 3/1997 | Kumagai | G01C 19/72 356/463 |
| 5,701,177 | A | * | 12/1997 | Kumagai | G01C 19/721 356/463 |
| 5,717,489 | A | | 2/1998 | Ozeki et al. | |
| 6,529,444 | B2 | * | 3/2003 | Vakoc | G01H 9/004 367/149 |
| 2003/0038946 | A1 | | 2/2003 | Takashima et al. | |

(Continued)

FOREIGN PATENT DOCUMENTS

| JP | 2008-309776 A | 12/2008 |
| JP | 2008309776 A | 12/2008 |

*Primary Examiner* — Natalie Huls
*Assistant Examiner* — Monica S Young
(74) *Attorney, Agent, or Firm* — Baker Botts L.L.P.; Michael A. Sartori

(57) ABSTRACT

An optical fiber sensor system includes a light source, a modulation unit, an optical coupler, a polarization separator, a first polarization controller optically coupled to the polarization separator, and a first detection unit that includes a first optical detector that receives the first component, converts the first component into a first electrical signal, and detects stress. The first polarization controller controls a polarization state of light input to the polarization separator so that the first electrical signal exhibits a first-order response to the stress.

8 Claims, 4 Drawing Sheets

(56) References Cited

U.S. PATENT DOCUMENTS

| | | |
|---|---|---|
| 2004/0141420 A1 | 7/2004 | Hardage et al. |
| 2005/0147341 A1* | 7/2005 | Patel .................. G01L 1/242 |
| | | 385/12 |
| 2005/0225746 A1 | 10/2005 | Nishikawa |
| 2005/0276611 A1* | 12/2005 | Patel .................. G01M 11/39 |
| | | 398/152 |
| 2010/0165350 A1* | 7/2010 | Zheng .................. G01C 19/72 |
| | | 356/465 |
| 2010/0281985 A1 | 11/2010 | Kumagai et al. |
| 2011/0141478 A1* | 6/2011 | Sasaki .................. G01R 15/246 |
| | | 356/483 |
| 2013/0033709 A1 | 2/2013 | Potin et al. |
| 2014/0025319 A1 | 1/2014 | Farhadiroushan et al. |
| 2018/0259337 A1* | 9/2018 | Wang .................. G01C 19/721 |

\* cited by examiner

OPTICAL FIBER SENSOR SYSTEM FOR STRAIN DETECTION

BACKGROUND OF THE INVENTION

The present invention relates to an optical fiber sensor system.

Japanese Unexamined Patent Publication No. 2008-309776 describes an optical fiber vibration sensor including a light source, a light receiver, a light branching and coupling portion having a polarizer and two couplers, and a fiber loop portion. The light source and the light branching and coupling portion are coupled optically, and light of which a light polarization state is controlled such that it is uniform by the polarizer is output to the fiber loop portion through the light branching and coupling portion. Clockwise light and counterclockwise light are propagated to the fiber loop portion. The clockwise light and the counterclockwise light are recombined and interfere in the light branching and coupling portion, and interference light is obtained. The interference light is received by a light receiver and converted into an electrical signal. When the acoustic signal is applied to the fiber loop, a different phase difference is imparted to the clockwise light and the counterclockwise light and an interference state of the interference light is changed. Stress applied to the fiber loop is detected by the light receiver receiving the interference light of which the interference state has been changed.

SUMMARY OF THE INVENTION

An optical fiber sensor system according to one aspect of the present invention includes a light source that outputs measurement light; a modulation unit that includes a looped optical path and a coil around which the optical path is wound, and modulates light passing through the optical path using stress applied to the coil; an optical coupler that is optically coupled to the light source and both ends of the optical path, receives the measurement light, causes the measurement light to branch into first light and second light of which polarization states are different from that of the measurement light, outputs the first light from the one end of the optical path to the other end, outputs the second light from the other end of the optical path to the one end, combines the first light input to the other end with the second light input to one end, and outputs interference light; a polarization separator that separates the interference light into a first component and a second component of which polarization states are orthogonal to each other and outputs the first component and the second component; a first polarization controller optically coupled to the polarization separator; and a first detection unit that includes a first optical detector that is optically coupled to the polarization separator and receives the first component output from the polarization separator, and converts the first component input to the first optical detector into a first electrical signal to detect a stress, wherein the first polarization controller controls a polarization state of light input to the polarization separator so that the first electrical signal exhibits a first-order response to the stress.

DESCRIPTION OF EMBODIMENTS

Figure 1:
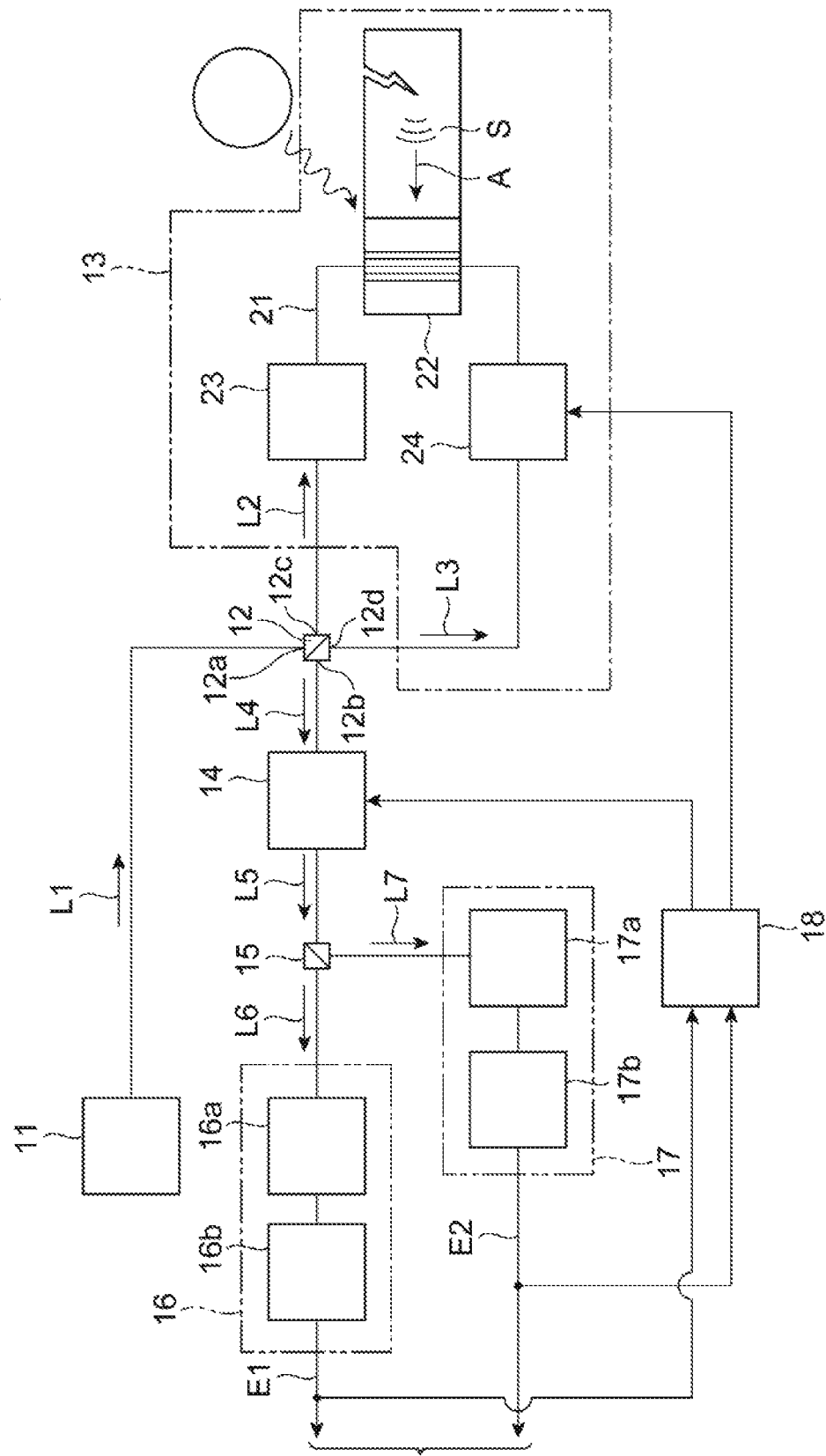
FIG. 1 is a diagram illustrating an optical fiber sensor system according to an embodiment.

Description of Embodiment of the Present Invention

First, details of an embodiment of the present invention will be described. (1) An optical fiber sensor system according to an embodiment of the present invention includes a light source that outputs measurement light; a modulation unit that includes a looped optical path and a coil around which the optical path is wound, and modulates light passing through the optical path using stress applied to the coil; an optical coupler that is optically coupled to the light source and both ends of the optical path, receives the measurement light, causes the measurement light to branch into first light and second light of which polarization states are different from that of the measurement light, outputs the first light from the one end of the optical path to the other end, outputs the second light from the other end of the optical path to the one end, combines the first light input to the other end with the second light input to one end, and outputs interference light; a polarization separator that separates the interference light into a first component and a second component of which polarization states are orthogonal to each other and outputs the first component and the second component; a first polarization controller optically coupled to the polarization separator; and a first detection unit that includes a first optical detector that is optically coupled to the polarization separator and receives the first component output from the polarization separator, and converts the first component input to the first optical detector into a first electrical signal to detect a stress, wherein the first polarization controller controls a polarization state of light input to the polarization separator so that the first electrical signal exhibits a first-order response to the stress.

In this optical fiber sensor system, the first polarization controller controls the polarization state of light input to the polarization separator so that the first electrical signal shows first-order dependence on stress. Accordingly, since a first electrical signal proportional to an amplitude of the acoustic signal due to stress can be obtained, it is possible to detect a weak acoustic signal with high sensitivity.

(2) The above-described optical fiber sensor system may further include a second detection unit including a second optical detector that is optically coupled to the polarization separator and receives the second component output from the polarization separator, the second detection unit converting the second component input to the second optical detector into the second electrical signal; and a control unit that controls the first polarization controller on the basis of the second electrical signal output from the second detection unit. Accordingly, it is possible to control the polarization state of light input to the polarization separator on the basis of the second component.

(3) In the above-described optical fiber sensor system, the control unit may control the first polarization controller so that a light intensity of the second component input to the second optical detector is minimized. Thus, it is possible to perform polarization control using the first polarization controller so that the light intensity of the first component is maximized. Therefore, it is possible to detect an acoustic signal with a higher sensitivity.

(4) The above-described optical fiber sensor system may further include a second polarization controller provided midway in the optical path. In this case, it is possible to control the polarization state of light passing through the optical path using the second polarization controller.

(5) In the above-described optical fiber sensor system, the control unit may control the second polarization controller on the basis of the first electrical signal. In this case, by the control unit controlling the second polarization controller, it is possible to control a polarization state of light passing through the optical path.

(6) In the above-described optical fiber sensor system, the control unit may control the second polarization controller so that a DC component of the first electrical signal becomes an average value between a maximum value and a minimum value. In this case, it is possible to increase a component showing first-order dependence on the stress.

(7) In the above-described optical fiber sensor system, the optical coupler may be a two-input two-output optical coupler. In this case, since ports of the optical coupler can be assigned for an input of measurement light, an output of interference light, and one end and the other end of the optical path, occurrence of light loss can be suppressed.

(8) In the above-described optical fiber sensor system, the measurement light may be linearly polarized light, the optical coupler may cause the measurement light to branch into the first light and the second light that are circularly polarized light, the modulation unit may have optical rotation characteristics and convert the first light and the second light into elliptically polarized light, and the optical coupler may combine the first light and the second light that are elliptically polarized light, and output the interference light that is elliptically polarized light different from the first light and the second light. By controlling the polarization state in this way, it is possible to efficiently generate a component exhibiting first-order dependence on the stress.

Detailed Description of Embodiment of Present Invention

A specific example of the optical fiber sensor system according to the embodiment of the present invention will be described with reference to the drawings. The present invention is not limited to such an example, and is intended to include all modifications defined in the claims and falling in a scope equivalent to the claims. In the following description, the same or corresponding elements are denoted with the same reference numerals in the description of the drawings, and repeated descriptions are omitted.

FIG. 1 illustrates a configuration of an optical her sensor system 1 according to an embodiment. The optical fiber sensor system 1 is, for example, an optical fiber acoustic sensor that is used for diagnosing soundness of a structure, and detects acoustic emission (AE) that is generated when a crack occurs in the structure. The optical fiber sensor system 1 includes a light source 11, an optical coupler 12, a modulation unit 13, a first polarization controller 14, a polarization separator 15, a first detection unit 16, a second detection unit 17, and a control unit 18.

The light source 11 is optically coupled to the optical coupler 12. The light source 11 outputs measurement light L1 to the optical coupler 12. For example, a broadband light source having a short coherent length can be used as the light source 11. In this case, it is possible to increase resistance to reflected light noise or the like.

The optical coupler 12 receives the measurement light L1 output by the light source 11. The optical coupler 12 is a two-input two-output optical coupler having four ports 12a, 12b, 12c, and 12d. The port 12a and the light source 11 are optically coupled, and the measurement light L1 output from the light source 11 is input to the port 12a. The optical coupler 12 causes the measurement light L1 to branch into clockwise light (first light) L2 and counterclockwise light (second light) L1 The measurement light L1, the clockwise light L2, and the counterclockwise light L3 have different polarization states.

The modulation unit 13 includes a looped optical path 21 that couples the port 12c to the port 12d, a coil 22 around which the optical path 21 is wound, a delay path 23 provided midway in the optical path 21, and a second polarization controller 24 that controls a polarization state of light passing through the optical path 21. One end of the optical path 21 is connected to the port 12c, and the other end of the optical path 21 is connected to the port 12d. Further, the delay path 23 is provided between the port 12c and the coil 22, and the second polarization controller 24 is provided between the coil 22 and the port 12d.

The clockwise light L2 is output from the port 12c and is input to the port 12d through the delay path 23, the coil 22, and the second polarization controller 24. The counterclockwise light L3 is output from the port 12d. and is input to the port 12c through the second polarization controller 24, the coil 22, and the delay path 23.

The optical coupler 12 combines the clockwise light L2 input to the port 12d with the counterclockwise light L3 input to the port 12c and outputs interference light L4 from the port 12b. Further, the optical path 21 includes an optical fiber, and is configured to have optical rotation characteristics. The optical rotation characteristics are realized, for example, by twisting of the optical fibers of the optical path 21.

Therefore, the clockwise light L2 and the counterclockwise light L3 respectively output from the port 12c and the port 12d, and the interference light L4 output from the port 12b have different polarization states. Further, since the clockwise light L2 and the counterclockwise light L3 propagate through the same optical path 21, optical path lengths of the clockwise light L2 and the counterclockwise light L3 are the same. Thus, the optical coupler 12 and the modulation unit 13 of this embodiment constitute a Sagnac interferometer.

Specifically, the light source 11 outputs the measurement light L1 that is linearly polarized light. The optical coupler 12 causes the measurement light L1 to branch into the clockwise light L2 and the counterclockwise light L3 that are circularly polarized light, and outputs the clockwise light L2 and the counterclockwise light L3 to the coil 22. Further, the modulation unit 13 has the optical rotation characteristics (for example, 45° optical rotation characteristics or an odd multiple thereof), converts the clockwise light L2 and the counterclockwise light L3 into elliptically polarized light, and outputs the elliptically polarized light to the optical coupler 12. The optical coupler 12 combines the clockwise light L2 and the counterclockwise light L3 that are the elliptically polarized light, and outputs interference light L4 that is the elliptically polarized light (for example, a polarization state thereof is rotated by 90°) different from the clockwise light L2 and the counterclockwise light L3.

Figure 2:
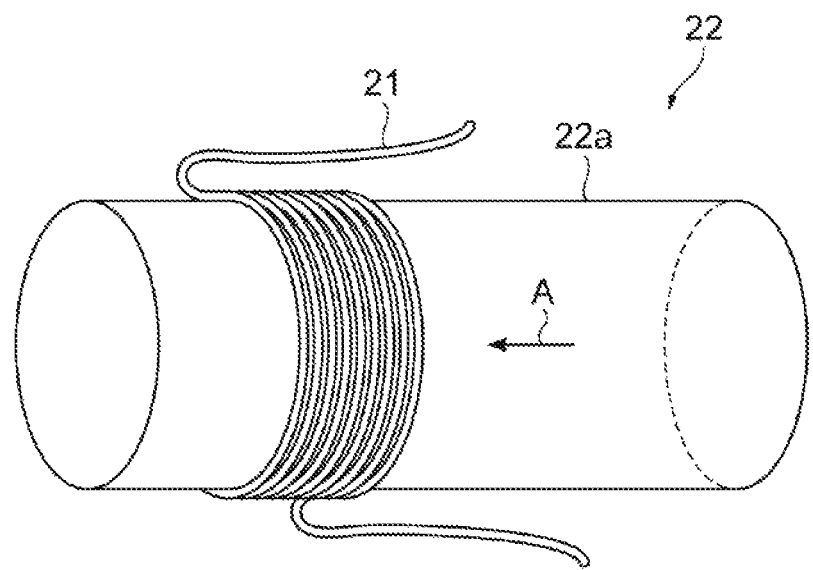
FIG. 2 is a diagram illustrating a coil functioning as a sensor head.

As illustrated in FIG. 2, the coil 22 has a core 22a around which the optical path 21 is helically wound. The coil 22 is attached to the structure S that is a measurement target, and functions as a sensor head of the optical fiber sensor system 1. The structure S emits an acoustic signal A due to mechanical disruption or the like to expand and contract the optical path 21 through the coil 22. In this case, due to stress that is applied to the coil 22, a refractive index of the optical fiber constituting the optical path 21 is changed and the optical path length of the clockwise light L2 and the counterclockwise light L3 is changed. As a result, phase modulation occurs in the clockwise light L2 and the counterclockwise light L3.

Referring back to FIG. 1, the delay path 23 imparts a delay to the clockwise light L2 and the counterclockwise light L3. The counterclockwise light L3 to which the delay has been imparted is directly output to the port 12c of the optical coupler 12. On the other hand, the clockwise light L2 to which the delay has been imparted is directly output to the port 12d of the optical coupler 12 through the coil 22 and the second polarization controller 24. Therefore, a timing of the modulation applied to the clockwise light L2 by the stress and a timing of the modulation applied to the counterclockwise light L3 by the stress are different from each other.

In this embodiment, the delay path 23 is arranged on an outbound path for the clockwise light L2. Therefore, the acoustic signal A is propagated to the clockwise light L2 with a delay of a predetermined time in comparison with the counterclockwise light L3. Further, the second polarization controller 24 is provided midway in the optical path 21 to control the polarization state of light passing through the optical path 21.

The first polarization controller 14 is optically coupled to the port 12b of the optical coupler 12. The interference light L4 output from the port 12b is input to the first polarization controller 14. The first polarization controller 14 controls the polarization state of the interference light L4 input from the port 12b. The control of the polarization state in the first polarization controller 14 and the second polarization controller 24 will be described in detail below.

The polarization separator 15 is optically coupled to the first polarization controller 14. The light L5 output from the first polarization controller 14 is input to the polarization separator 15. The polarization separator 15 separates the input light L5 into a first component L6 and a second component L7 having different polarization states and outputs the separated light. For example, the first component L6 and the second component L7 are orthogonal to each other.

The first detection unit 16 is optically coupled to the polarization separator 15. The first component L6 output from the polarization separator 15 is input to the first detection unit 16, and a first electrical signal E1 that is a detection signal for detecting an acoustic signal is generated. The first detection unit 16 includes, for example, a first optical detector 16a and a first amplifier 16b. The first optical detector 16a converts a light intensity of the input first component L6 into a voltage value. The first amplifier 16b generates the first electrical signal E1 from the voltage value obtained by the first optical detector 16a and outputs the first electrical signal E1.

The second detection unit 17 is optically coupled to the polarization separator 15. A second component L7 output from the polarization separator 15 is input to the second detection unit 17, and a second electrical signal E2 that is a detection signal for detecting an acoustic signal is generated. The second detection unit 17 includes, for example, a second optical detector 17a and a second amplifier 17b. The second optical detector 17a converts a light intensity of the input second component L7 into a voltage value. The second amplifier 17b generates the second electrical signal E2 from the voltage value obtained by the second optical detector 17a and outputs the second electrical signal E2.

The control unit 18 controls the first polarization controller 14 on the basis of the second electrical signal E2 output from the second detection unit 17. The control unit 18 controls the first polarization controller 14 so that the light intensity of the second component L7 input to the second detection unit 17 is minimized. The control unit 18 controls the polarization state of the light L5 using the first polarization controller 14 to add a component proportional to the amplitude of the acoustic signal A to the interference light L4.

Further, the control unit 18 controls the second polarization controller 24 on the basis of the first electrical signal E1 output from the first detection unit 16. The control unit 18 controls the second polarization controller 24 so that the DC component of the first electrical signal E1 is an average value between the maximum value and the minimum value. Thus, the control unit 18 performs polarization control of the light passing through the optical path 21 using the second polarization controller 24. Therefore, it is possible to increase a component proportional to the amplitude of the acoustic signal A.

Figure 3:
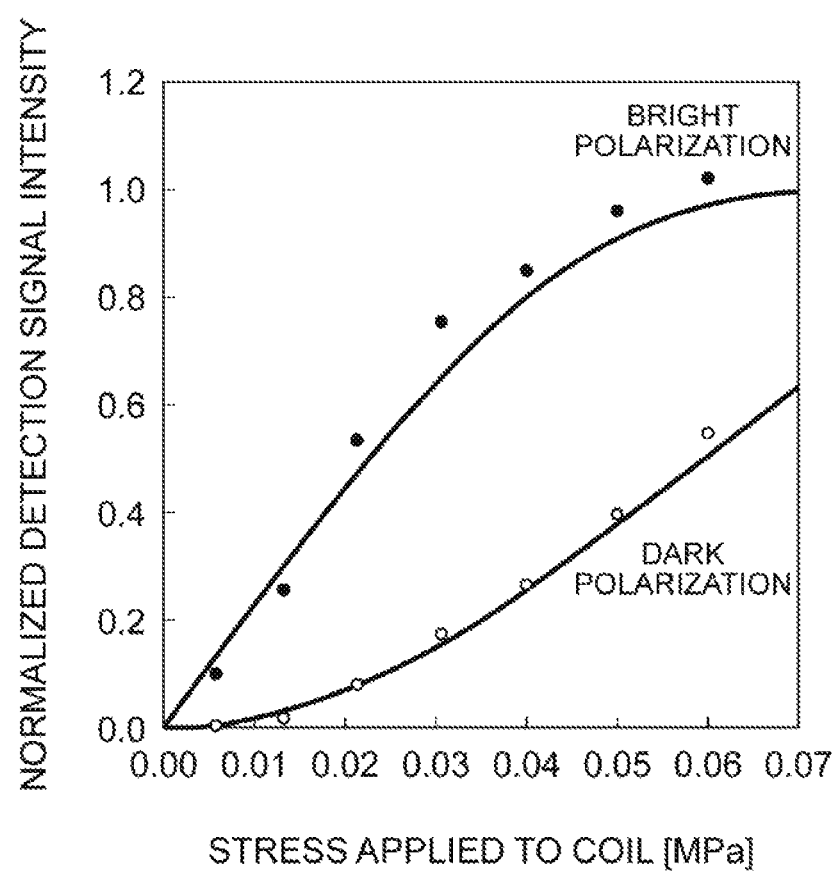
FIG. 3 is a graph illustrating a relationship between a stress applied to a coil and an intensity of a detection signal

FIG. 3 is a graph illustrating a relationship between stress applied to the coil 22 and an intensity of the electrical signals E1 and E2. As illustrated in FIG. 3, if the second component L7 on the side on which the output is minimized is dark polarization and the first component L6 orthogonal to the dark polarization is bright polarization, the signal intensity of the dark polarization is proportional to a square of the stress, and the signal intensity of the bright polarization is proportional to the first power of stress when the weak signal is input due to the stress.

Figure 4:
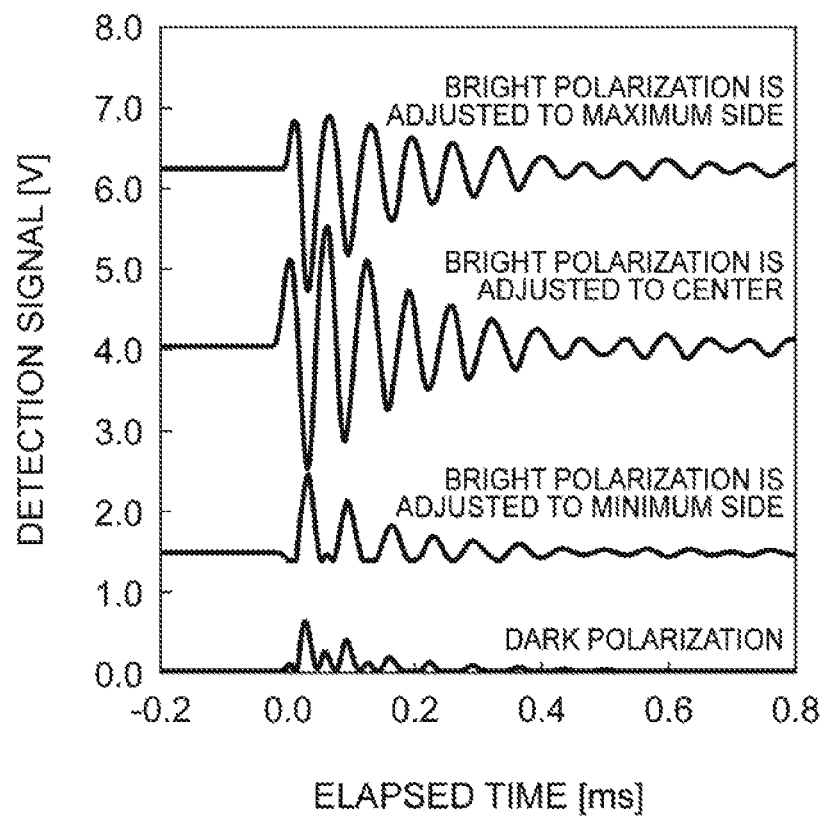
FIG. 4 is a graph illustrating an intensity of a detection signal in each polarization in a chronological order.

FIG. 4 is a graph illustrating time-series data of the intensity of the electrical signal E1 in each of bright polarization and dark polarization. When the DC component of the bright polarization has been adjusted to a maximum side or a minimum side, a component proportional to a square of the stress in the electrical signal E1 increases. On the other hand, when the second polarization controller 24 controls the polarization state of the light passing through the optical path 21 and the bright polarization is adjusted to an average value between the maximum value and the minimum value, a component proportional to the stress can be maximized. Both of the minimum value and the maximum value described above are values that vary with the resolution of the second polarization controller 24, and indicate measurable minimum and maximum values.

Next, effects obtained from the optical fiber sensor system 1 will be described in greater detail.

In the optical fiber sensor system 1, the light L5 of which the polarization state has been controlled is output from the first polarization controller 14 so that the interference light including a component exhibiting a first-order dependence on the acoustic signal A is output. In the polarization separator 15, the first component L6 exhibiting the first-order dependence on the acoustic signal A is output as a branch and is input to the first optical detector 16a. The first polarization controller 14 controls the polarization state of the interference light L4 so that the first electrical signal E1 exhibits first-order dependence on stress. Therefore, it is possible to detect a weak acoustic signal A with high sensitivity.

Further, the optical fiber sensor system 1 includes the second detection unit 17 that includes the second optical detector 17a that is optically coupled to the polarization separator 15 and receives the second component L7 output from the polarization separator 15, and converts the second component L7 input to the second optical detector 17a into the second electrical signal E2 and the control unit 18 that controls the first polarization controller 14 on the basis of the second electrical signal E2 output from the second detection unit 17. Thus, the polarization state of the light L5 input to the polarization separator 15 can be controlled on the basis of the second electrical signal E2.

Further, in the optical fiber sensor system 1, the control unit 18 controls the first polarization controller 14 so that a light intensity of the second component 13 input to the second detection unit 17 is minimized. Accordingly, since the first polarization controller 14 can be controlled so that the light intensity of the first component L6 is maximized, it is possible to detect the acoustic signal A with high sensitivity.

Further, the optical fiber sensor system 1 includes a second polarization controller 24 provided midway in the optical path 21. Therefore, the polarization state of light passing through the optical path 21 can be controlled by the second polarization controller 24.

Further, in the optical fiber sensor system 1, the control unit 18 controls the second polarization controller 24 on the basis of he first electrical signal E1. Thus, the control unit 18 controls the second polarization controller 24, making it possible to control the polarization state of light passing through the optical path 21.

Further, in the optical fiber sensor system 1, the control unit 18 controls the second polarization controller 24 so that a DC component of the first electrical signal E1 becomes an average value of a maximum value and a minimum value. Accordingly, since the first electrical signal E1 exhibiting first-order dependence on stress can be output, it is possible to detect a weak acoustic signal A with high sensitivity.

Further, in the optical fiber sensor system 1, the optical coupler 12 is a two-input two-output optical coupler. Thus, the ports 12a to 12d of the optical coupler 12 can he assigned for an input of the measurement light L1, an output of the interference light L4, and one end and the other end of the optical path 21, and occurrence of light loss can be suppressed.

Further, in the optical fiber sensor system 1, the measurement light L1 is linearly polarized light, and the optical coupler 12 causes the measurement light L1 to branch into the clockwise light L2 and the counterclockwise light L3 that are circularly polarized light. The modulation unit 13 has optical rotation characteristics and converts the clockwise light L2 and the counterclockwise light L3 into elliptically polarized light. The optical coupler 12 combines the clockwise light L2 and the counterclockwise light L3 that are elliptically polarized light, and outputs the interference light L4 that is elliptically polarized light different from the clockwise light L2 and the counterclockwise light L3. By constituting the optical coupler 12 and the modulation unit 13 in this way, it is possible to efficiently add a component having a polarization state exhibiting a first-order response to stress to the interference light L4. Therefore, it is possible to efficiently generate a component exhibiting the first-order response to the stress.

An embodiment of the present invention has been described, but the present invention is not limited to the above-described embodiment, and various modifications may be made without departing from the gist of the present invention. For example, in the above-described embodiment, the delay path 23 is arranged in an outbound path for the clockwise light L2. However, an arrangement aspect of the delay path 23 is not limited to the above embodiment and, for example, the delay path 23 may be arranged in an outbound path for the counterclockwise light L3.

What is claimed is:

1. An optical fiber sensor system, comprising:
a light source that outputs measurement light;
a modulation unit that includes a looped optical path and a coil around which the optical path is wound, and modulates light passing through the optical path using stress applied to the coil;
an optical coupler that is optically coupled to the light source and both ends of the optical path, receives the measurement light, causes the measurement light to branch into first light and second light of which polarization states are different from that of the measurement light, outputs the first light from the one end of the optical path to the other end, outputs the second light from the other end of the optical path to the one end, combines the first light input to the other end with the second light input to one end, and outputs interference light;
a polarization separator that separates the interference light into a first component and a second component of which polarization states are orthogonal to each other and outputs the first component and the second component;
a first polarization controller optically coupled to the polarization separator; and
a first detection unit that includes a first optical detector that is optically coupled to the polarization separator and receives the first component output from the polarization separator, and converts the first component input to the first optical detector into a first electrical signal,
wherein the first polarization controller controls a polarization state of light input to the polarization separator so that the first electrical signal exhibits a first-order response to the stress.

2. The optical fiber sensor system of claim 1, further comprising:
a second detection unit including a second optical detector that is optically coupled to the polarization separator and receives the second component output from the polarization separator, the second detection unit converting the second component input to the second optical detector into the second electrical signal; and
a control unit that controls the first polarization controller on the basis of the second electrical signal output from the second detection unit.

3. The optical fiber sensor system of claim 2,
wherein the control unit controls the first polarization controller so that a light intensity of the second component input to the second optical detector is minimized.

4. The optical fiber sensor system of claim 2, wherein the modulation unit further comprises:
a second polarization controller provided in the optical path.

5. The optical fiber sensor system of claim 4,
wherein the control unit controls the second polarization controller on the basis of the first electrical signal.

6. The optical fiber sensor system of claim 4,
wherein the control unit controls the second polarization controller so that a DC component of the first electrical signal becomes an average value between a maximum value and a minimum value.

7. The optical fiber sensor system of claim 1,
wherein the optical coupler is a two-input two-output optical coupler.

8. The optical fiber sensor system of claim 1,
wherein the measurement light is linearly polarized light,
the optical coupler causes the measurement light to branch into the first light and the second light that are circularly polarized light,
the modulation unit has optical rotation characteristics and converts the first light and the second light into elliptically polarized light, and
the optical coupler combines the first light and the second light that are elliptically polarized light, and outputs the interference light that is elliptically polarized light different from the first light and the second light.

\* \* \* \* \*